US011760189B2

(12) United States Patent
Ehn et al.

(10) Patent No.: US 11,760,189 B2
(45) Date of Patent: Sep. 19, 2023

(54) ELECTRIC DRIVE

(71) Applicant: Volvo Car Corporation, Gothenburg (SE)

(72) Inventors: Joakim Ehn, Gothenburg (SE); Håkan Sandström, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 228 days.

(21) Appl. No.: 17/307,403

(22) Filed: May 4, 2021

(65) Prior Publication Data
US 2021/0347247 A1 Nov. 11, 2021

(30) Foreign Application Priority Data
May 5, 2020 (EP) ..................................... 20172926

(51) Int. Cl.
*B60K 11/02* (2006.01)
*H02K 5/20* (2006.01)
*B60K 1/00* (2006.01)
*H02K 7/00* (2006.01)
*H02K 9/19* (2006.01)

(52) U.S. Cl.
CPC ................ *B60K 11/02* (2013.01); *B60K 1/00* (2013.01); *H02K 5/203* (2021.01); *H02K 7/003* (2013.01); *H02K 9/19* (2013.01); *B60K 2001/006* (2013.01)

(58) Field of Classification Search
CPC .... B60K 11/02; B60K 1/00; B60K 2001/006; H02K 5/203; H02K 7/003; H02K 9/19; H02K 1/32
See application file for complete search history.

(56) References Cited

U.S. PATENT DOCUMENTS

2003/0132673 A1* 7/2003 Zhou .................. H02K 1/32
310/54
2020/0036248 A1* 1/2020 Krais .................. H02K 1/32

FOREIGN PATENT DOCUMENTS

| DE | 102017214507 A1 | 2/2019 | |
| EP | 1522749 A1 * | 4/2005 | ............... B23Q 1/70 |
| EP | 2562914 A1 | 2/2013 | |
| EP | E P-2562914 A1 * | 2/2013 | ............... H02K 1/32 |
| EP | 1522749 A1 | 4/2013 | |
| JP | 2019216555 A | 12/2019 | |

OTHER PUBLICATIONS

Extended EP Search Report for EP Application No. 20172926.6 dated Oct. 19, 2020.

* cited by examiner

*Primary Examiner* — Jacob M Amick
*Assistant Examiner* — Charles J Brauch
(74) *Attorney, Agent, or Firm* — Amin, Turocy & Watson, LLP

(57) ABSTRACT

Electric drive (100, 200, 300, 400) for a vehicle, comprising: at least one hollow shaft (101, 201, 301, 401) mounted for rotation about an axis of rotation; at least one rotor unit (102, 202) being arranged rotationally fixed with the hollow shaft (101, 201, 301, 401); at least one coolant circuit being provided at least partially between the hollow shaft (101, 201, 301, 401) and the rotor unit (102, 202); the coolant circuit comprising at least one cooling section (105, 205) being provided adjacent to the rotor unit (102, 202); and wherein the cooling section (105, 205) has an increasing radius at least partially along its extension parallel to the axis of rotation.

20 Claims, 4 Drawing Sheets

ELECTRIC DRIVE

CROSS-REFERENCE TO RELATED APPLICATIONS

This application claims the benefit of priority to EP Patent Application No. 20172926.6 filed May 5, 2020 entitled "ELECTRIC DRIVE." The entirety of the aforementioned application is hereby incorporated herein by reference.

TECHNICAL FIELD

The present disclosure relates to an electric drive for a vehicle, a use of such an electric drive in a vehicle and a vehicle comprising such an electric drive.

BACKGROUND ART

In the prior art, electric drives/electric machines are known in a variety of different designs. For example, synchronous motors are known comprising a rotor unit in which permanent magnets are arranged. These permanent magnets can be driven by magnetic interaction provided by a stator unit arranged around the rotor unit. Thereby, the rotor unit may be set in rotation.

During the use of an electric drive, the rotor unit and in particular the magnets of the rotor unit can become warmer. However, such a temperature increase has a negative effect on the efficiency of the electric drive reducing the performance of the electric drive. It is therefore generally known in the prior art to cool the rotor unit. For example, it is known to feed pressurized oil through the complete driveline by means of respective oil pumps.

SUMMARY

In view of this, it is found that a further need exists to provide an improved electric drive with an alternative cooling concept for the rotor unit.

In the view of the above, it is an object of the present invention to provide an improved electric drive with an alternative cooling concept for the rotor unit.

These and other objects, which become apparent upon reading the following description, are solved by the subject matter of the independent claims. The dependent claims refer to preferred embodiments of the invention.

According to a first aspect, an electric drive for a vehicle is provided, comprising: at least one hollow shaft mounted for rotation about an axis of rotation; at least one rotor unit being arranged rotationally fixed with the hollow shaft; at least one coolant circuit provided at least partially between the hollow shaft and the rotor unit; wherein the coolant circuit comprises at least one cooling section which is provided adjacent to the rotor unit; and wherein the cooling section has an increasing radius or diameter at least partially along its extension parallel to the axis of rotation.

In other words, the present disclosure proposes to provide a coolant circuit comprising at least a cooling section, which is provided adjacent to the rotor unit, in particular immediately adjacent to the magnets of the rotor unit. This cooling section extends along a direction parallel to the axis of rotation of the rotor unit. However, it is provided that the radius of the cooling section increases along the axis of rotation, i.e. that the distance of the cooling section from the axis of rotation is not constant, but increases parallel to the axis of rotation. In an example, the distance to the rotation axis increases with a constant value, i.e. the cooling section is arranged quasi inclined to the rotation axis. The radius of the cooling section increases in the direction in which the coolant is to be transported or moved. This is because the rotation of the rotor unit forces the coolant in the direction of the increasing radius, i.e. a coolant guided in the cooling section moves in the direction of the increasing radius due to the rotation. Thus, the present disclosure makes it possible to guide a coolant, e.g. oil, along the magnets of the rotor unit without the need for a pump or similar conveying device. Moreover, it is possible to transport the coolant to the cooling section with its increasing diameter back towards the center of the hollow shaft and then to a gearbox without the need of a separate pump. Thereby, the rotor unit may be cooled and the performance of the electric drive can be increased without having a coolant, e.g. oil, in the electric machine. As a result, the present disclosure may provide an electric drive more agile due to a higher performance, at low costs, weight and complexity.

In this context, it should be noted that the term electric drive is to be understood in a broad sense and is not limited to a specific design of a drive unit. Also the term rotor unit is to understand broadly and is not limited to a certain design of a rotor unit.

In an implementation, the cooling section may comprise bores arranged spirally around the hollow shaft. In an additional or alternative implementation, the cooling section may comprise straight-line bores. In an additional or alternative implementation, the cooling section may be designed as a circulating chamber. In this context, it should be noted that the present disclosure is not limited to a specific geometry of the cooling section and comprises all geometries which, at least in a section, have an expanding radius or diameter in order to move a coolant by rotation in a direction along the axis of rotation. By using a built-in shaft solution with drilled channels, the shaft can be transported inside the rotor unit providing a compact structure and allowing to minimize the volume of the needed coolant to cool the rotor unit.

In an implementation, the coolant circuit may comprise an inflow section, which is in fluid communication with the cooling section and is adapted to conduct coolant to the cooling section. The function of the inflow section is to conduct the coolant to the cooling section, whereby the geometry of the inflow section is designed so that the coolant is conveyed by the rotation of the rotor unit. However, the present disclosure is not limited to a certain geometry of the inflow section.

In an implementation, the inflow section may be provided by bores provided from the hollow shaft to the cooling section. In an example, several bores can be provided around the hollow shaft, which are arranged on a common conical surface and which extend from the hollow shaft to the cooling section. This makes it possible to introduce the coolant into the hollow shaft and lead it to the cooling section via the bores, wherein the coolant in the inflow section is also moved by the rotation of the rotor unit.

In an implementation, the coolant circuit may comprise a discharge section adapted to direct coolant from the cooling section towards the axis of rotation. The function of the discharge section is to lead the coolant away from the cooling section so that it can be led back into a coolant chamber or a gearbox and from there to the inflow section again, thus providing a closed coolant circuit. The present disclosure is not limited to a certain geometry of the discharge section as long as the coolant can be led away from the cooling section.

In an implementation, the discharge section may be provided by bores provided from the cooling section to the hollow shaft, wherein the hollow shaft having a larger inner diameter at the discharge section than at the inflow section. In an example, several bores can be provided around the hollow shaft, which are arranged on a common conical surface and which extend from the cooling section to the hollow shaft. In this implementation, the diameter of the hollow shaft at the inflow section is smaller than the diameter at the discharge section. This provides a pressure difference between the inflow section and the discharge section, which allows coolant to be forced out of the discharge section to the hollow shaft from where it may be led to a gearbox or coolant reservoir.

In an implementation, the discharge section may be provided by at least one spatula element, which is arranged rotatably with respect to the hollow shaft by a bearing arrangement provided on the hollow shaft. In an example, the spatula element is arranged at a front end of the cooling section. In this implementation, the discharge section may not comprise bores, but only one or more spatula elements. In this implementation, the spatula element may not rotate, so that the coolant may be guided along the spatula element in the direction of the hollow shaft without the coolant being forced outwards by the rotation of the rotor unit.

In an implementation, the discharge section may be provided by a discharge chamber which is provided non-rotating, axially adjacent to the cooling section and which is arranged in axial extension on the hollow shaft. In such an implementation, the inflow section may be provided in the hollow shaft. In an example, such the coolant circuit may comprise an inflow section within the hollow shaft, a cooling section provided by a chamber with an increasing radius/diameter leading the coolant to a discharge chamber, which is arranged axially adjacent to the cooling section. The inflow section and the cooling section may be connection by means of radially provided bores or holes leading from the inflow section to the cooling section. The cooling section and the discharge chamber may also be connected by means of radially provided bores or holes leading from the cooling section to the discharge chamber. From the discharge chamber, the coolant may be led to a gearbox or coolant chamber, e.g. oil separator.

In an implementation, no pump unit, e.g. an oil pump, may be provided in the coolant circuit. The present disclosure allows to provide a coolant circuit for the rotor unit, which may provide a coolant flow/movement without a separate pump unit, only driven by the rotation of the rotor unit. Thereby, the rotor unit may be cooled and the performance of the electric drive can be increased without the need of providing a pump unit, thereby also reducing the weight of a disclosed drive unit.

A further aspect relates to a use of an electric drive described above in a vehicle. A further aspect relates to a vehicle comprising at least one electric drive explained above. In an example, the vehicle is an electric vehicle or a hybrid vehicle with an electric drive.

BRIEF DESCRIPTION OF DRAWINGS

In the following, the disclosure is described exemplarily with reference to the enclosed figure, in which.

Notably, the figures are merely schematic representations and serve only to illustrate an embodiment of the present disclosure. Identical or equivalent elements are in principle provided with the same reference signs.

DESCRIPTION OF EMBODIMENTS

Figure 1:
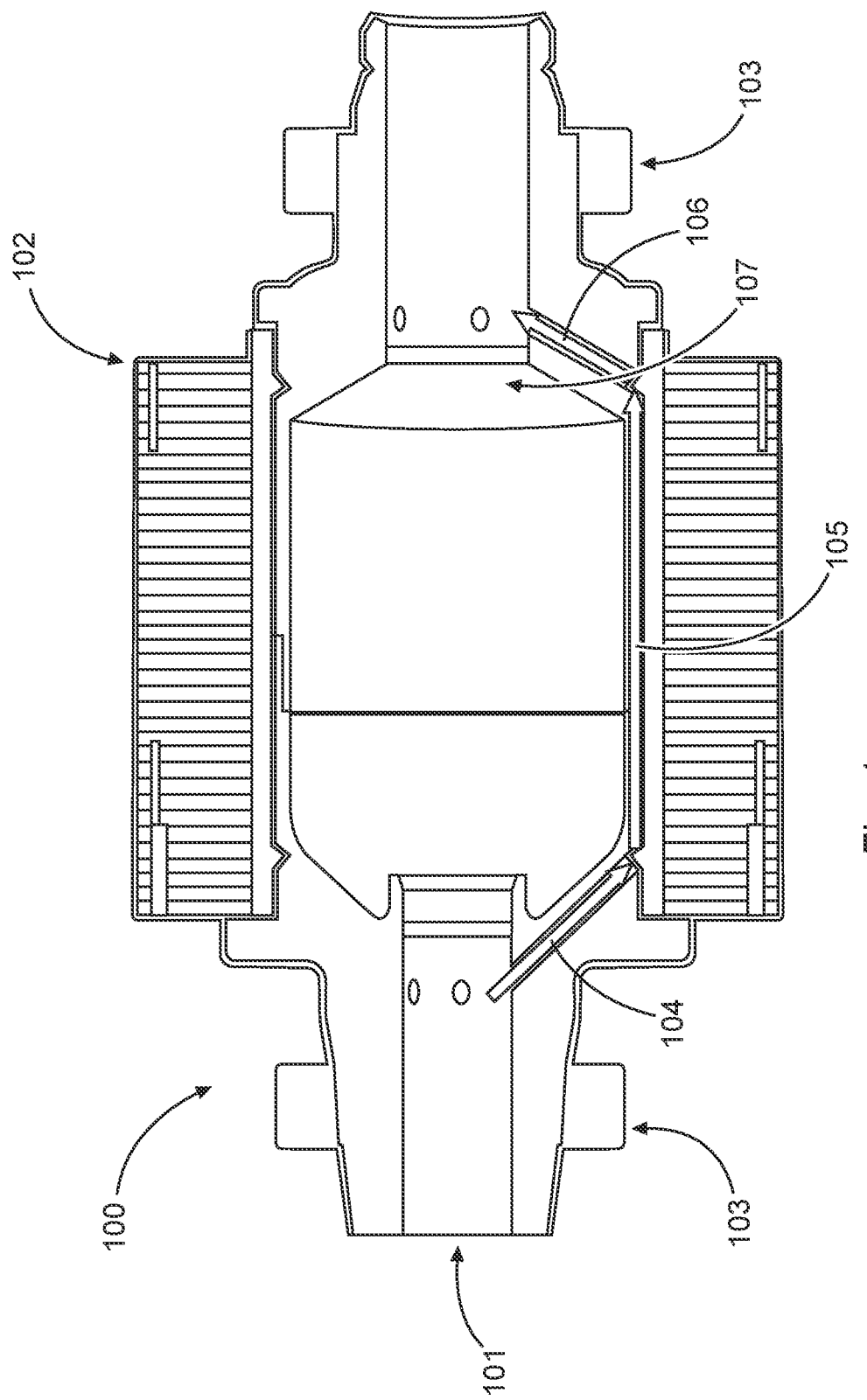
FIG. 1 is a schematic view of a drive unit according to an embodiment of the present disclosure.

FIG. 1 is a schematic view of a drive unit 100 according to an embodiment of the present disclosure. The drive unit 100 comprises hollow shaft 101 mounted for rotation about an axis of rotation, a rotor unit 102, which is arranged rotationally fixed with the hollow shaft 101, i.e. when the rotor unit 102 is driven by a stator unit (not shown), the rotor unit 101 and thus the hollow shaft 101 are rotated. The drive unit 100 or the rotor unit 102 may be rotatably connected with the stator unit by means of corresponding bearing assemblies 103.

The drive unit 100 further comprises a coolant circuit comprising at least an inflow section 104, a cooling section 105 and a discharge section 106. In FIG. 1, the path of the coolant through the inflow section 104, the cooling section 105 and the discharge section 106 is indicated by arrows.

The function of the inflow section 104 is to conduct the coolant, e.g. oil, to the cooling section 105, whereby the geometry of the inflow section 104 is designed so that the coolant is conveyed by the rotation of the rotor unit 102. The inflow section 104 may be provided by channels or bores 104 leading from the hollow shaft 101 to the cooling section 105. Several channels or bores 104 can be provided around the hollow shaft 101, which can be arranged on a common conical surface and which extend from the hollow shaft 101 to the cooling section 105. This makes it possible to introduce the coolant into the hollow shaft 101 and lead it to the cooling section 105 via the bores 104 of the inflow section 104, wherein the coolant in the inflow section 104 is moved by the rotation of the rotor unit 102.

The cooling section 105 in the shown embodiment comprises bores 105 arranged around the hollow shaft 101 adjacent to the rotor unit 102, in particular immediately adjacent to the magnets of the rotor unit 102. The bores 105 may be provided in any desired geometry, e.g. spirally arranged around the hollow shaft 101 or as straight-line bores arranged around the hollow shaft 101. In addition or as alternative to the channels/bores 105 also a chamber or several chambers surrounding the hollow shaft 101 may be provided in the cooling section 105.

In the shown embodiment, the bores 105 in the cooling section 105 have an expanding radius or diameter in order to move a coolant by rotation in a direction along the axis of rotation, i.e. the distance of the cooling section from the axis of rotation is not constant, but increases parallel to the axis of rotation. In the shown embodiment, the distance of the bores 105 to the rotation axis increases with a constant value, i.e. the cooling section 105 is arranged quasi inclined to the rotation axis. The radius of the cooling section 105 increases in the direction in which the coolant is to be transported or moved, e.g. in the shown embodiment, the radius/diameter of the bores increases towards the right side. Thus, the coolant is moved along the cooling section 105 to the right side due to the rotation of the rotor unit forcing the coolant in the direction of the increasing radius. This movement of the coolant can be provided without the need for a pump or similar conveying device.

The discharge section 106 is adapted to direct coolant from the cooling section 105 towards the axis of rotation, i.e. towards the hollow shaft 101. The function of the discharge section 106 is to lead the coolant away from the cooling section 105 so that it can be led back into a coolant chamber or a gearbox and from there again to the hollow shaft 101 and the inflow section 104 providing a closed coolant circuit.

The discharge section 106 is provided by bores 106 connecting the cooling section 105 with the hollow shaft 101. In the shown embodiment, the hollow shaft 101 having a larger inner diameter at the discharge section 106 than at the inflow section 104 (indicated by the arrow 107 in FIG. 1). This provides a pressure difference between the inflow section 104 and the discharge section 106, which allows coolant to be forced out of the discharge section 106 to the hollow shaft 101 from where it may be led to a gearbox or coolant reservoir (not shown).

Figure 2:
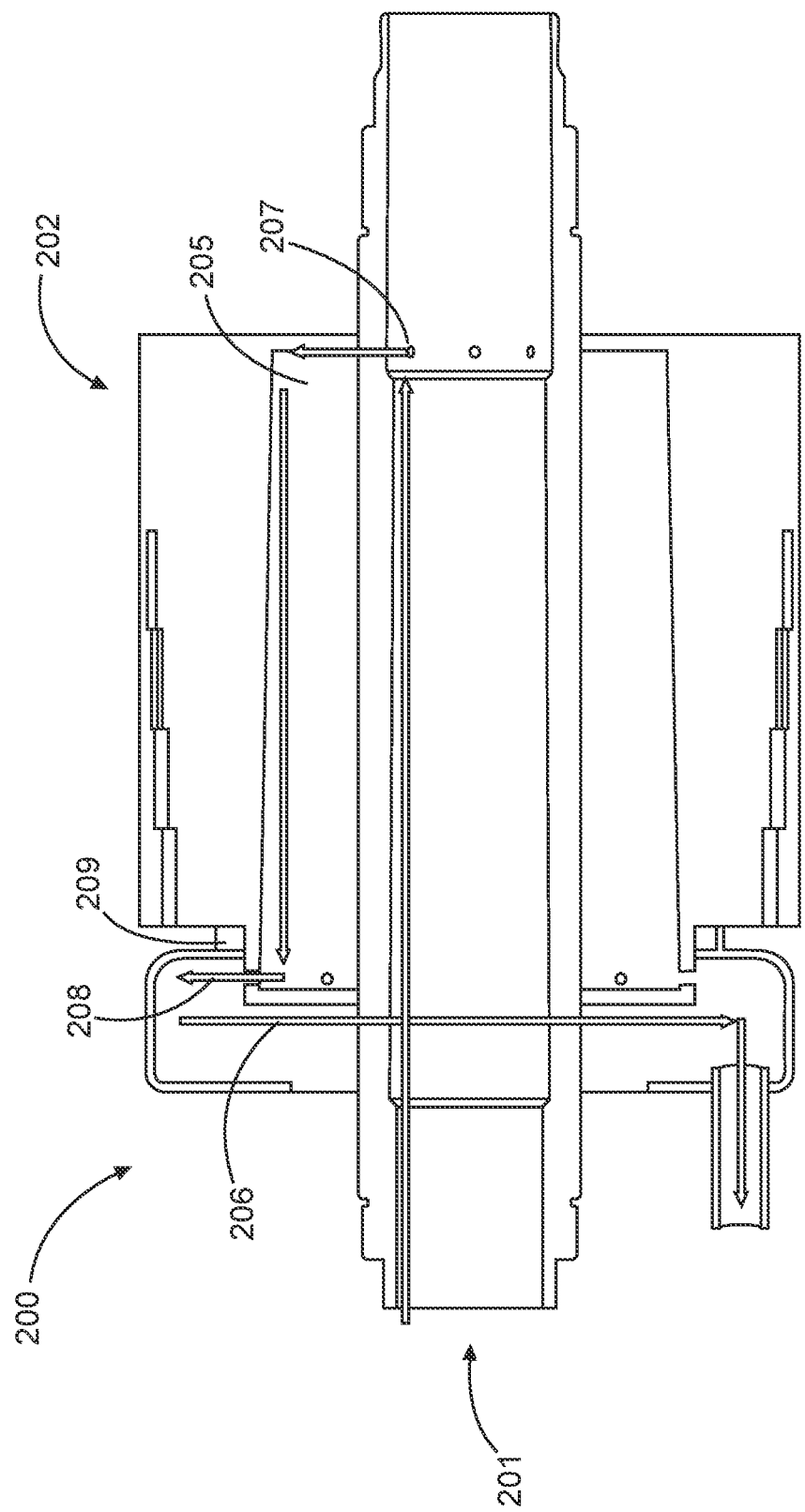
FIG. 2 is a schematic view of a drive unit according to a further embodiment of the present disclosure.

FIG. 2 is a schematic view of a drive unit 200 according to a further embodiment of the present disclosure.

In this embodiment, the coolant circuit may comprise an inflow section within the hollow shaft 201, a cooling section 205 provided by a cooling chamber 205 with an increasing radius/diameter leading the coolant to a discharge chamber 206, which is arranged axially adjacent to the cooling section 205. In FIG. 2, the path of the coolant through the hollow shaft 201, the cooling section 205 and the discharge chamber 206 is indicated by arrows.

The inflow section/the hollow shaft 201 and the cooling section 205 may be connection by means of radially provided bores 207 or holes leading from the hollow shaft 201 to the cooling section 205. The cooling section 205 and the discharge chamber 206 may also be connected by means of radially provided bores 208 or holes leading from the cooling section 205 to the discharge chamber 206. From the discharge chamber 206, the coolant may be led to a gearbox or coolant chamber, e.g. oil separator. In the shown embodiment, the discharge chamber 206 is supported by means of at least one bearing assembly 209 which is provided near the rotor unit 202 and/or at a wall section of the cooling chamber 205 such that the discharge chamber 206 does not rotate with the rotor unit 202.

Figure 3:
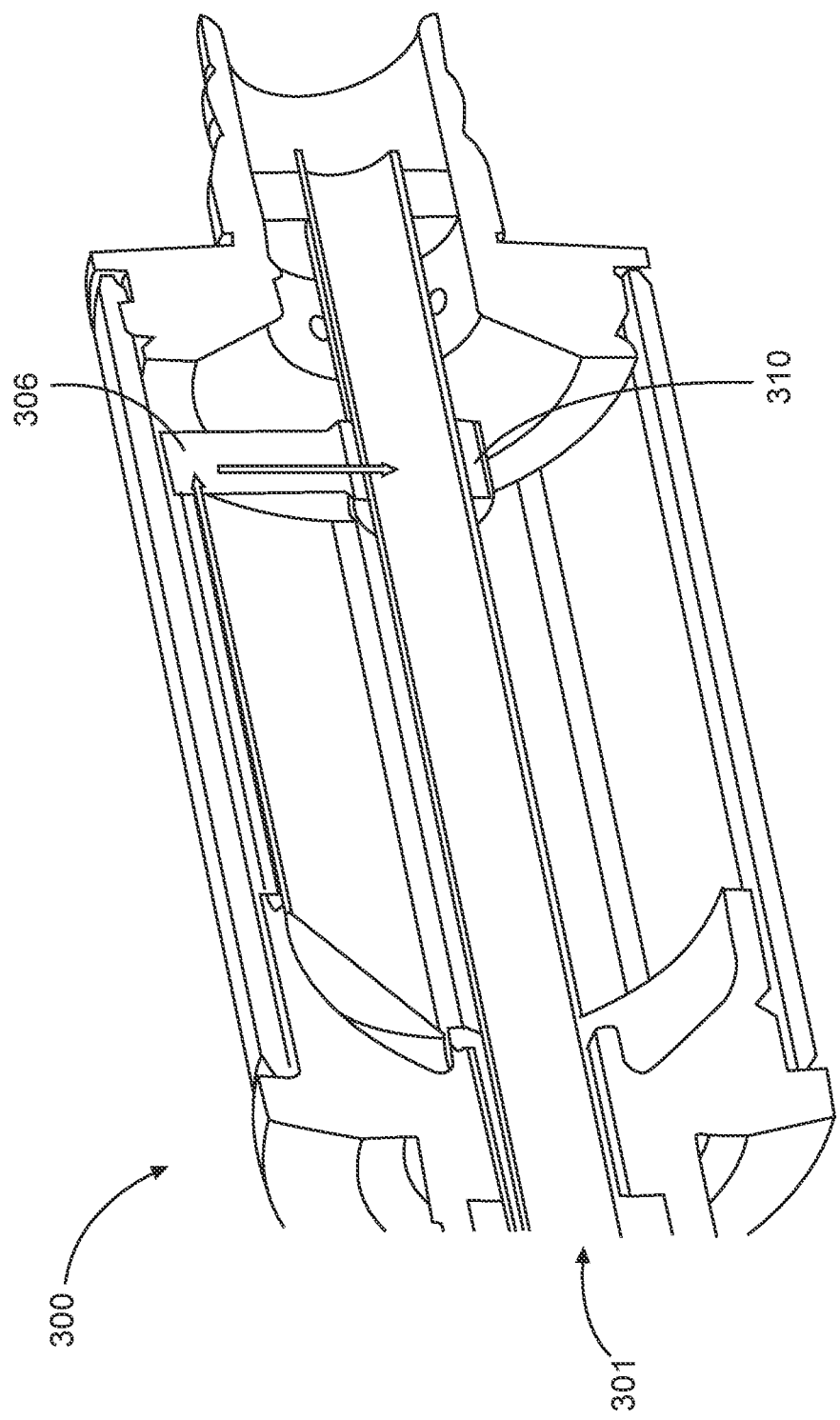
FIG. 3 is a schematic view of a drive unit according to a further embodiment of the present disclosure.

FIG. 3 is a schematic view of a drive unit 300 according to a further embodiment of the present disclosure. In FIG. 3, the path of the coolant is indicated by arrows.

In comparison to the two embodiments shown above, this embodiment comprises a spatula element 306 as a discharge section 306, which is provided on the front side of the cooling section 305. The spatula element 306 is arranged on the hollow shaft 301 by means of a bearing assembly 310 so that the spatula element 306 does not rotate with the rotor unit (not shown) and the hollow shaft 301. The coolant can therefore be guided in the direction of the hollow shaft 301 on the spatula element 306 without the coolant being forced outwards by rotation. At the hollow shaft 301, the coolant may be lead into the hollow shaft by means of respective bores or similar means. In this embodiment, the coolant may be passed through an inflow section and a cooling section as shown in the design example in FIG. 1.

Figure 4:
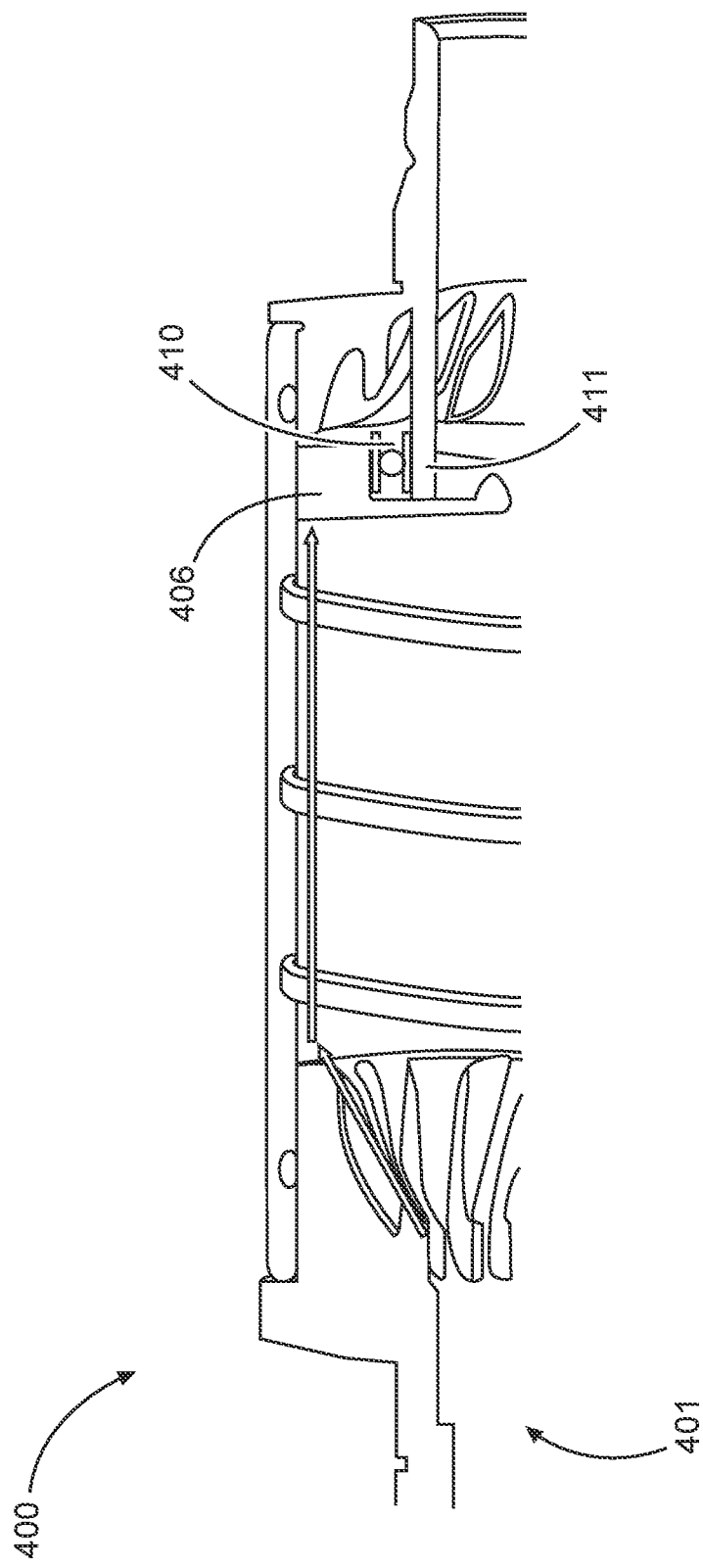
FIG. 4 is a schematic view of a drive unit according to a further embodiment of the present disclosure.

FIG. 4 is a schematic view of a drive unit 400 according to a further embodiment of the present disclosure. This embodiment corresponds to the embodiment shown in FIG. 3 comprising an alternative design of a spatula element 406. In FIG. 4, the path of the coolant through is indicated by arrows. In this embodiment, the spatula element 406 is supported on a bearing assembly 410, which is arranged on a supporting wall 411 of the housing of the drive unit 400.

Other variations to the disclosed embodiment can be understood and effected by those skilled in the art in practicing the claimed subject matter, from the study of the drawings, the disclosure, and the appended claims. In particular, respective parts/functions of the respective embodiments described above may also be combined with each other. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 100 drive unit (first embodiment)
101 hollow shaft
102 rotor unit
103 bearing assemblies
104 inflow section/bores/channels
105 cooling section/bores/channels
106 discharge section/bores/channels
200 drive unit (second embodiment)
201 hollow shaft
202 rotor unit
205 cooling section/cooling chamber
206 discharge section/discharge chamber
207 bores between hollow shaft and cooling chamber
208 bores between cooling chamber and discharge chamber
209 bearing assembly
300 drive unit (third embodiment)
301 hollow shaft
306 discharge section/spatula element
310 bearing assembly
400 drive unit (fourth embodiment)
401 hollow shaft
406 discharge section/spatula element
410 bearing assembly
411 supporting wall

The invention claimed is:

1. An electric drive for a vehicle, comprising:
   a hollow shaft mounted for rotation about an axis of rotation;
   a rotor unit which is arranged rotationally fixed with the hollow shaft; and
   a coolant circuit provided at least partially between the hollow shaft and the rotor unit, wherein the coolant circuit is a closed coolant circuit, and the coolant circuit comprises:
      a cooling section which is provided adjacent to the rotor unit, and wherein the cooling section has an increasing radius at least partially along its extension parallel to the axis of rotation,
      an inflow section that is in fluid communication with the cooling section, and is adapted to conduct coolant to the cooling section, and
      a discharge section that is adapted to direct the coolant from the cooling section towards the axis of rotation.

2. The electric drive of claim 1, wherein the cooling section comprises bores arranged spirally around the hollow shaft.

3. The electric drive of claim 1, wherein the cooling section comprises straight-line bores.

4. The electric drive of claim 1, wherein the cooling section is designed as a circulating chamber.

5. The electric drive of claim 1, wherein the inflow section is provided by bores provided from the hollow shaft to the cooling section.

6. The electric drive of claim 1, wherein the hollow shaft has a larger inner diameter at an outflow portion of the hollow shaft than at an inflow portion of the hollow shaft.

7. The electric drive of claim 1, wherein the discharge section comprises at least one spatula element, which is arranged rotatably with respect to the hollow shaft by a bearing arrangement provided on the hollow shaft.

8. The electric drive of claim 1, wherein the discharge section comprises a discharge chamber which is provided axially adjacent to the cooling section.

9. The electric drive of claim 1, where no pump unit is provided in the coolant circuit.

10. A use of an electric drive, wherein the electric drive comprises:
  a hollow shaft mounted for rotation about an axis of rotation;
  a rotor unit which is arranged rotationally fixed with the hollow shaft; and
  a coolant circuit provided at least partially between the hollow shaft and the rotor unit, wherein the coolant circuit is a closed coolant circuit, and the coolant circuit comprises:
    a cooling section which is provided adjacent to the rotor unit, and wherein the cooling section has an increasing radius at least partially along its extension parallel to the axis of rotation,
    an inflow section that is in fluid communication with the cooling section, and is adapted to conduct coolant to the cooling section, and
    a discharge section that is adapted to direct the coolant from the cooling section towards the axis of rotation.

11. A vehicle comprising:
  at least one electric drive, wherein the at least one electric drive comprises:
    a hollow shaft mounted for rotation about an axis of rotation;
    a rotor unit which is arranged rotationally fixed with the hollow shaft; and
    a coolant circuit provided at least partially between the hollow shaft and the rotor unit, wherein the coolant circuit is a closed coolant circuit, and the coolant circuit comprises:
      a cooling section which is provided adjacent to the rotor unit, and wherein the cooling section has an increasing radius at least partially along its extension parallel to the axis of rotation,
      an inflow section that is in fluid communication with the cooling section, and is adapted to conduct coolant to the cooling section, and
      a discharge section that is adapted to direct the coolant from the cooling section towards the axis of rotation.

12. The vehicle of claim 11, wherein the cooling section comprises bores arranged spirally around the hollow shaft.

13. The vehicle of claim 11, wherein the cooling section comprises straight-line bores.

14. The vehicle of claim 11, wherein the cooling section is designed as a circulating chamber.

15. The vehicle of claim 11, wherein the hollow shaft has a larger inner diameter at an outflow portion of the hollow shaft than at an inflow portion of the hollow shaft.

16. The vehicle of claim 15, wherein the inflow section is provided by bores provided from the hollow shaft to the cooling section.

17. The vehicle of claim 11, wherein the discharge section comprises a discharge chamber which is provided axially adjacent to the cooling section.

18. The vehicle of claim 11, where no pump unit is provided in the coolant circuit.

19. The vehicle of claim 11, wherein the discharge section comprises at least one spatula element.

20. The vehicle of claim 19, wherein the at least one spatula element is mounted on the hollow shaft by a bearing assembly that allows the at least one spatula element to rotate around the hollow shaft independently of the rotation of the hollow shaft and the rotor unit about the axis of rotation.

* * * * *